(12) United States Patent
Bramson et al.

(10) Patent No.: US 7,143,501 B2
(45) Date of Patent: Dec. 5, 2006

(54) METHOD FOR ASSEMBLY OF AN AUTOMOTIVE ALTERNATOR STATOR ASSEMBLY WITH RECTANGULAR CONTINUOUS WIRE

(75) Inventors: Eric D. Bramson, Ann Arbor, MI (US); Kirk E. Neet, Saline, MI (US); Steven J. Yockey, Ypsilanti, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 418 days.

(21) Appl. No.: 10/447,829

(22) Filed: May 29, 2003

(65) Prior Publication Data

US 2004/0237287 A1 Dec. 2, 2004

(51) Int. Cl.
*H02K 15/00* (2006.01)
*H02K 15/16* (2006.01)
*H02H 15/14* (2006.01)

(52) U.S. Cl. .............................. 29/596; 29/598; 29/605; 29/606; 29/609; 29/732; 29/734; 29/736; 140/92.1; 310/259

(58) Field of Classification Search ................. 29/596, 29/598, 605, 606, 609, 732, 734, 736; 140/92.1; 310/259
See application file for complete search history.

(56) References Cited

U.S. PATENT DOCUMENTS

| 1,552,384 | A |   | 9/1925 | MacMillan |
|---|---|---|---|---|
| 2,695,969 | A | * | 11/1954 | Yates ........................... 310/259 |
| 3,585,428 | A |   | 6/1971 | Bennington |
| 3,705,459 | A |   | 12/1972 | Biddison |
| 3,827,141 | A | * | 8/1974 | Hallerback .................... 29/596 |
| 4,437,028 | A |   | 3/1984 | Ikeda |
| 4,741,098 | A | * | 5/1988 | Barrera ......................... 29/736 |
| 4,750,258 | A | * | 6/1988 | Anderson ..................... 29/596 |
| 5,955,808 | A |   | 9/1999 | Hill |
| 6,081,059 | A |   | 6/2000 | Hsu |
| 6,206,052 | B1 |   | 3/2001 | Bo |
| 2002/0011755 | A1 |   | 1/2002 | Shteynberg et al. |
| 2002/0092152 | A1 |   | 7/2002 | Asao et al. |
| 2003/0098379 | A1 |   | 5/2003 | Stockman et al. |

FOREIGN PATENT DOCUMENTS

| GB | 2 127 331 A | 4/1984 |
|---|---|---|
| GB | 2 152 766 A | 8/1985 |
| GB | 2 160 797 A | 1/1986 |

* cited by examiner

Primary Examiner—A. Dexter Tugbang
Assistant Examiner—Tim Phan
(74) Attorney, Agent, or Firm—Brinks Hofer Gilson & Lione

(57) ABSTRACT

A method of forming a stator core assembly for an electric machine includes providing a stator core having a plurality of radially extending slots, forming a flat wire pack having a plurality of continuous electrical wires, shaping the flat wire pack into a substantially cylindrical shape, and engaging the substantially cylindrically shaped flat wire pack with the stator core such that the continuous electrical wires are interlaced within the slots of the stator core.

25 Claims, 6 Drawing Sheets

METHOD FOR ASSEMBLY OF AN AUTOMOTIVE ALTERNATOR STATOR ASSEMBLY WITH RECTANGULAR CONTINUOUS WIRE

FIELD OF INVENTION

The invention relates to a method of forming an armature for an electrical machine, and in particular for an automotive electrical alternator.

BACKGROUND OF THE INVENTION

This invention is related to a method of forming an armature for an electrical alternator, of a type particularly adapted for use in motor vehicle applications including passenger cars and light trucks. Today's motor vehicles feature a dramatic increase in the number of electrical on-board systems and accessories. Such electrical devices include interior and exterior lighting, climate control systems; and increasingly sophisticated power train control systems, vehicle stability systems, traction control systems, and anti-lock brake systems. Vehicle audio and telematics systems place further demands on the vehicle's electrical system. Still further challenges in terms of the output capacity of the motor vehicle's electrical alternators will come with the widespread adoption of electrically assisted power steering and electric vehicle braking systems. Compounding these design challenges is the fact that the vehicle's electrical system demands vary widely, irrespective of the engine operating speed which drives the alternator and changes through various driving conditions.

In addition to the challenges of providing high electrical output for the vehicle electrical alternator, further constraints include the desire to minimize the size of the alternator with respect to under hood packaging limitations, and its mass which relates to the vehicle's fuel mileage.

In addition to the need of providing higher electrical output, designers of these devices further strive to provide high efficiency in the conversion of mechanical power delivered by the engine driven belt to electrical power output. Such efficiency translates directly into higher overall thermal efficiency of the motor vehicle and thus into fuel economy gains. And finally, as is the case with all components for mass-produced motor vehicles, cost remains a factor in the competitive offerings of such components to original equipment manufacturers.

In addressing these issues, manufactures of automobile alternators have developed alternator stators having interlaced continuous electrical conductors. These conductors are typically wound by hand, making the process time consuming and expensive.

Therefore, there is a need for a method of automatically winding the electrical conductors of the armature of an electrical alternator that will reduce the manufacturing time of the armatures, thereby reducing the manufacturing cost of the armatures.

SUMMARY OF THE INVENTION

In accordance with an aspect of the present invention, a method of forming a stator core assembly for an electric machine is provided wherein: a stator core having a plurality of radially extending slots is provided, a flat wire pack having a plurality of continuous electrical wires is formed, the flat wire pack is shaped into a substantially cylindrical shape, and the flat wire pack is engaged with the stator core such that the continuous electrical wires are interlaced within the slots of the stator core.

In another aspect of the present invention the flat wire pack is formed by providing a plurality of spools of continuous electrical wire, and rotatably mounting the spools of continuous electrical wire to a rotating structure in a generally circular pattern wherein the spools are equally circumferentially spaced with respect to one another about a central axis. First and second springs spaced from one another are placed at a distance from the spools of wire. Each of the springs is rotatable about an axis extending longitudinally through the springs and the axis of each of the springs is parallel to the central axis. End of the electrical wire from each of the spools are attached to consecutive coils of the first spring. The spools are rotated about the central axis such that the electrical wires are wrapped around consecutive coils of the second spring. Both springs are rotated such that the electrical wires are carried along the springs away from the spools of wire. The springs and the spools are rotated simultaneously and continuously such that the wires are wrapped alternately between consecutive loops of the first and second springs as the wires are carried along the springs, thereby forming a flat wire pack of interlaced continuous electrical wires.

In still another aspect of the present invention, at least one transitional area is formed within the flat wire pack. The transitional area is formed by stopping the forward rotation of the spools about the central axis and stopping the rotation of the springs, moving a first of the springs toward the spools of continuous electrical wire while simultaneously rotating the first spring to carry the wire along the first spring such that the first spring extends outward toward the spools of continuous electrical wire and exposes a plurality of free coils, rotating the spools one complete revolution about the central axis in the opposite direction such that the wires wrap in the opposite direction on the exposed coils of the first spring, and moving the first spring away from the spools of continuous electrical wire to its original position and commencing the forward rotation of the spools about the central axis and the rotation of both of the springs.

DESCRIPTION OF THE PREFERRED EMBODIMENTS

In order to provide a framework for a further detailed description of the preferred embodiments of this invention, a brief description of a typical electrical alternator is provided. The typical electrical alternator has a housing, a rotor shaft supported by rolling element bearings, and a belt driven pulley fastened to the protruding front end of rotor shaft. Front and rear alternator poles pieces rotate with the rotor shaft and have extending claw fingers. The claw fingers interlace to create the well known "claw pole" rotor configuration. Although the "claw pole" rotor is described, one skilled in the art will recognize that the described invention can be used in conjunction with other types of rotors, such as; permanent magnet non-claw pole, permanent magnet claw pole, salient field wound and induction type rotors. An excitation winding is carried within the cavity formed between pole pieces, and a DC signal is applied to the excitation winding through a pair of slip rings and associated brushes. The magnetic field produced by the winding interacts with i.e., claw pole pieces to create an alternating polarity magnetic field. The movement of the alternating polarity magnetic field presented by the rotor assembly through the core windings generates electricity in a well-known manner.

Electrical energy produced by the electrical alternator generated within the core assembly is directed to rectifying diodes and perhaps further filtering and power conditioning devices before being connected with the vehicle's electric distribution bus. Control systems, also known as voltage regulators, are used to apply an appropriate level of DC voltage to the excitation windings to generate the desired RMS value of the outputted alternating current from the alternator, which can be in single phase or multi-phase form, depending on the design and winding pattern of windings.

One preferred configuration for the windings of the stator core is described in U.S. patent application Ser. No. 10/265,529, filed on Oct. 7, 2002 which is a continuation-in-part application corresponding to U.S. patent application Ser. No. 10/056,890 filed on Jan. 24, 2002, entitled "Automobile Alternator Stator Assembly With Rectangular Continuous Wire". Both applications are assigned to the assignee of the present application and are hereby incorporated by reference herein.

The present application relates to a method of forming the stator assembly for an electrical machine such as the alternator described above. The method of forming a stator core assembly for an electric machine includes: providing a stator core having a plurality of radially extending slots; forming a flat wire pack having a plurality of continuous electrical wires; shaping the flat wire pack into a substantially cylindrical shape; and engaging the substantially cylindrically shaped flat wire pack with the stator core such that the continuous electrical wires are interlaced within the slots of the stator core.

Figure 1:
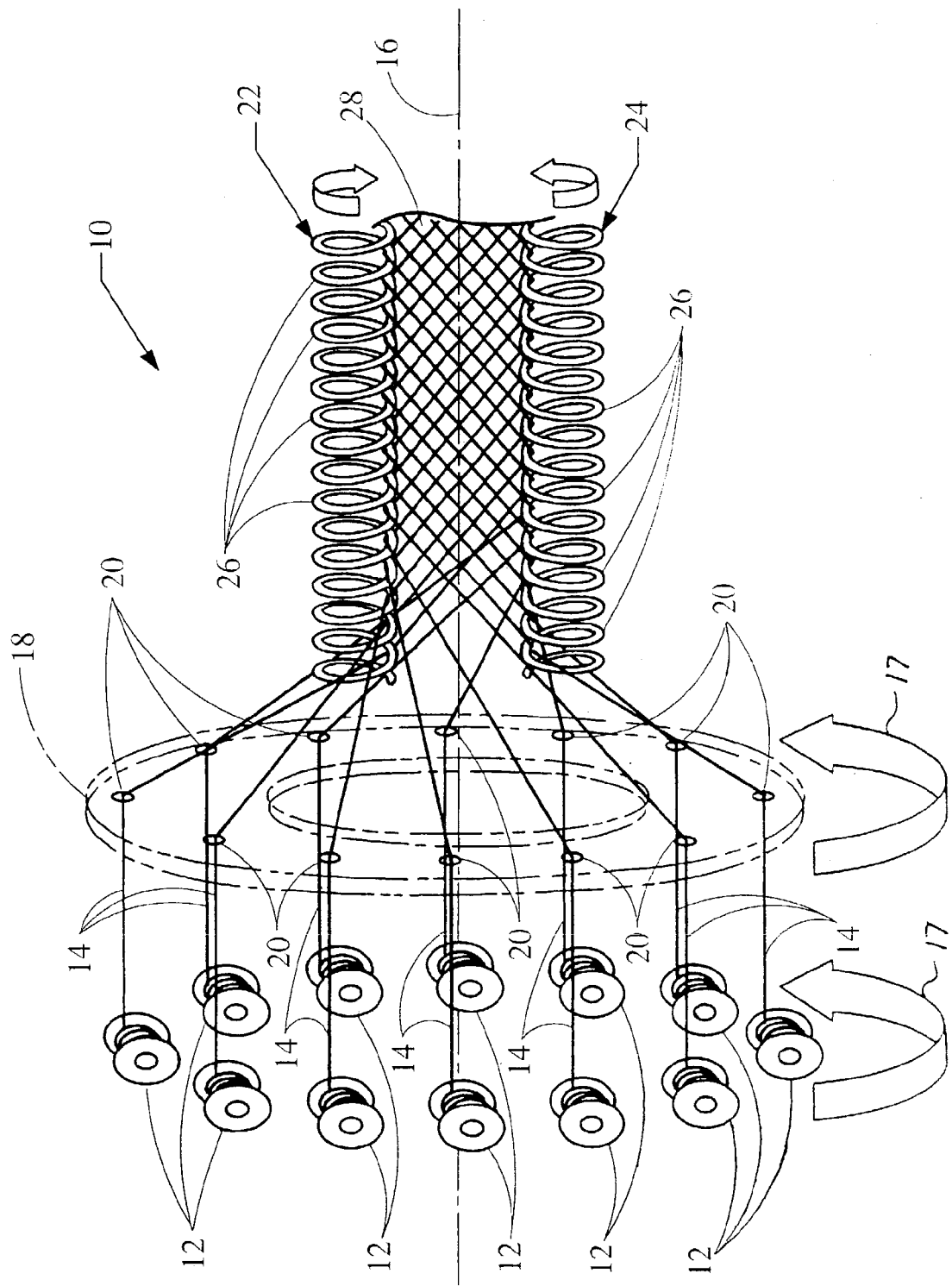
FIG. 1 is a schematic view of a device for forming a flat wire pack of continuous electrical conductors in an interlaced configuration.
Figure 2:
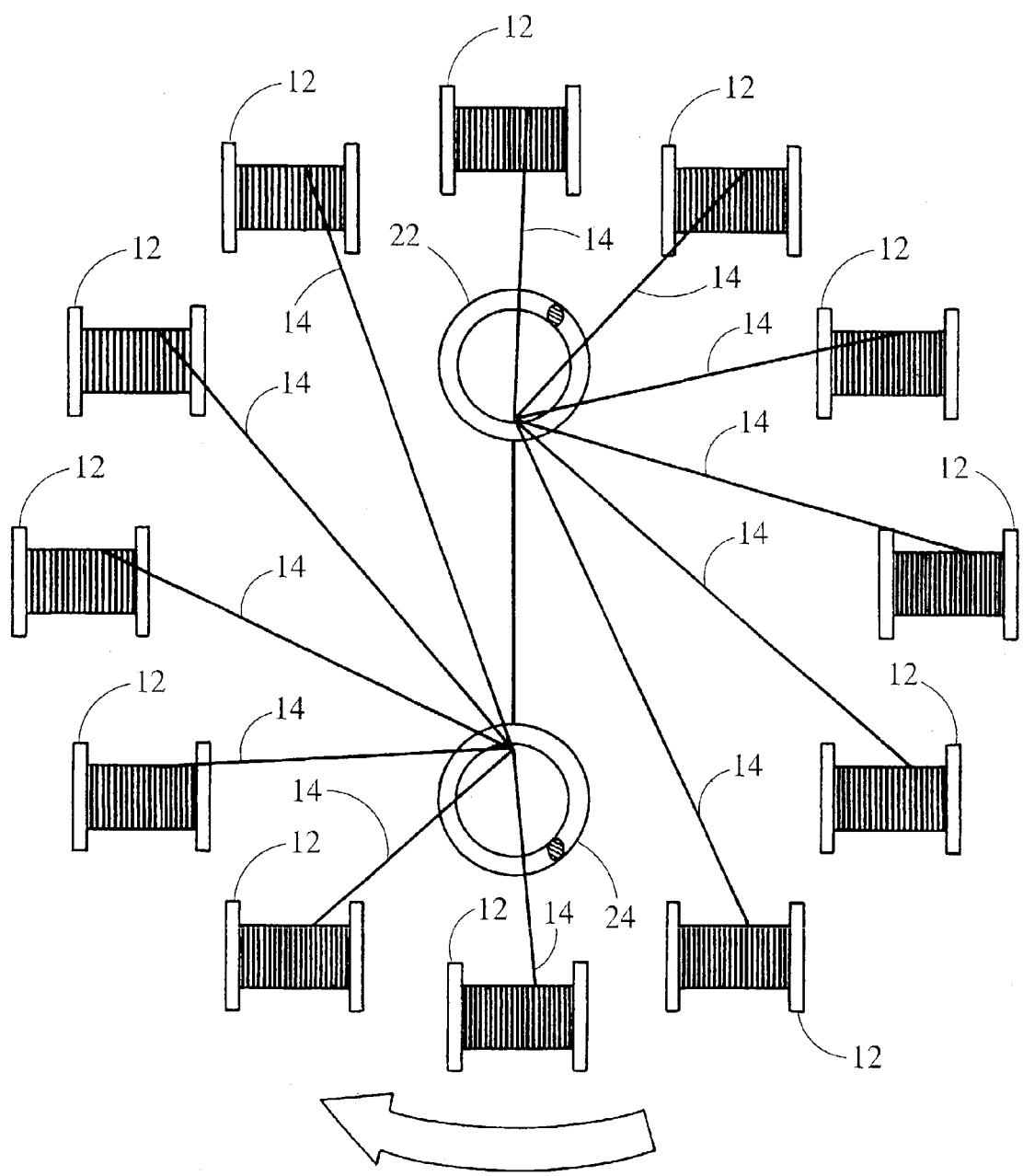
FIG. 2 is a schematic end view of the device shown in FIG. 1.

Referring to FIGS. 1 and 2, a device for forming a flat wire pack of continuous conductors is shown generally at 10. The device 10 includes a plurality of spools 12 of continuous electrical conductor wire 14. Preferably, the wire 14 is rectangular in its cross-sectional shape, but it is to be understood that the method of the present invention could be practiced with wire 14 having any suitable cross-sectional shape.

The spools 12 are rotatably mounted, equally spaced, in a generally circular pattern about a central axis 16 within the device 10. A plate 18 is mounted at a distance from the spools 12. The plate 18 includes a plurality of openings 20, one for each spool 12. For purposes of illustration, the present invention is described with twelve spools 12 of electrical wire 14. It is to be understood, that the method of the present invention could be practiced with any suitable number of spools 12 as determined by the number of conductors and the number of phases of the desired stator assembly.

A pair of first and second springs 22, 24 are positioned at a distance from the plate 18, opposite the spools 12, and at a distance from one another. Each of the springs 22, 24 is rotatable about its own longitudinal axis and is oriented such that the longitudinal axis of each spring 22, 24 is parallel to the central axis 16.

When forming a flat wire pack of electrical wire 14, the ends of the wire 14 from each of the spools 12 are fed through the corresponding openings 20 within the plate 18 and are attached to adjacent consecutive coils 26 of the first spring 22. Once the ends of the wires 14 are attached, the spools 12 and the plate 18 are rotated about the central axis 16, preferably in a counterclockwise direction as designated by arrows 17. Simulataneously, the first and second springs 22, 24 are rotated such that the wires are carried along the springs 22, 24 away from the plate 18 in an auger like fashion. As the spools 12 and the plate 18 rotate, the wires 14 will be consecutively wrapped around the free coils 26 of the second spring 24. As each wire 14 is wrapped, the rotation of the springs 22, 24 will carry that wire 14 along the springs 22, 24 away from the plate 18 such that when the next adjacent wire 14 contacts the springs 22, 24, a free coil will be available to receive the wire 14.

The springs 22, 24 are rotated at a speed faster than the spools 12 and the plate 18 such that the timing will insure that a free coil 26 is available as each consecutive wire 14 is wrapped around either of the first and second springs 22, 24. As described and shown in FIGS. 1 and 2, the springs 22, 24 would rotate twelve times as fast at the spools 12 and the plate 18. In other words, the springs 22, 24 will make twelve complete rotations for every single complete rotation of the plate 18 and spools 12 to insure that twelve coils 26 are exposed for each of the twelve electrical wires 14.

The spools 12 are allowed to rotate relative to the central axis 16 as they rotate about the central axis 16, thereby keeping the spools 12 rotationally stationary with respect to their own axis and oriented the same throughout the rotation of the spools 12 around the central axis 16. This insures that the rectangular wires 14 are not twisted as they are fed from the spools 12 through the openings 20 within the plate 18 and onto the coils 26 of the springs 22, 24.

The spools 12 and the springs 22, 24 are rotated simultaneously in this manner, wrapping the electrical wires 14 alternately between consecutive coils 26 of the first and second springs 22, 24 as the electrical wires 14 are carried along the springs 22, 24 until a flat wire pack 28 of sufficient length is formed. The length of the flat wire pack 28 is determined based upon the number of phases desired in the stator and the number of radially extending slots of the stator core. For example, in a single phase, single layer, stator assembly, the flat wire pack 28 will comprise one full rotation of the spools 12 and the plate 18 for every slot within the stator core. Therefore, if the core has sixty-four slots, then the flat wire pack will require sixty-four full rotations of the spools 12 and plate 18. Alternatively, if the stator assembly has four phases and a single layer, then the flat wire pack 28 will comprise sixteen full rotations (64/4=16) of the spools 12 and plate 18. Finally, if the stator assembly has four phases and a double layer, then the flat wire pack will comprise thirty-two full rotations (64/4× 2=32) of the spools 12 and plate 18. In summary, the number of full rotations of the spools 12 and plate 18 is the number of slots of the stator core divided by the number of phases of the stator assembly multiplied by the number of layers of electrical conductor within the stator core.

Figure 3:
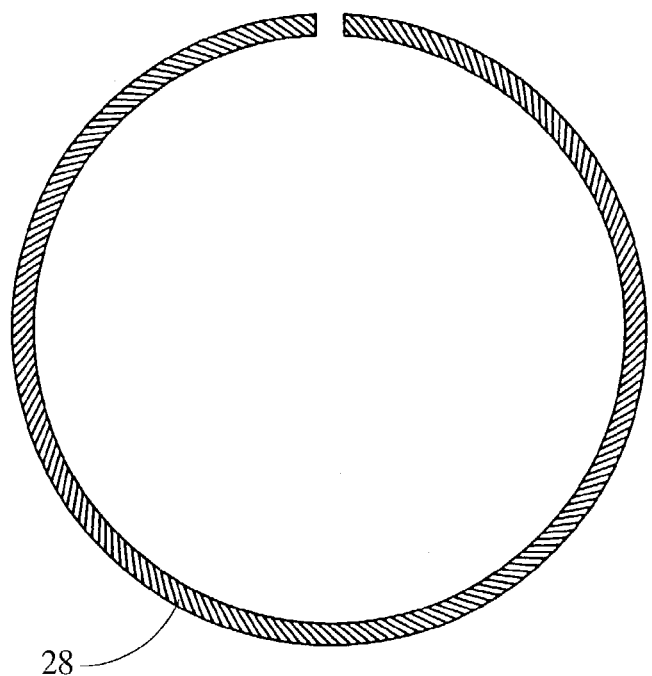
FIG. 3 is a top view of a flat wire pack that has been rolled into a generally cylindrical shape having a single layer.
Figure 4:
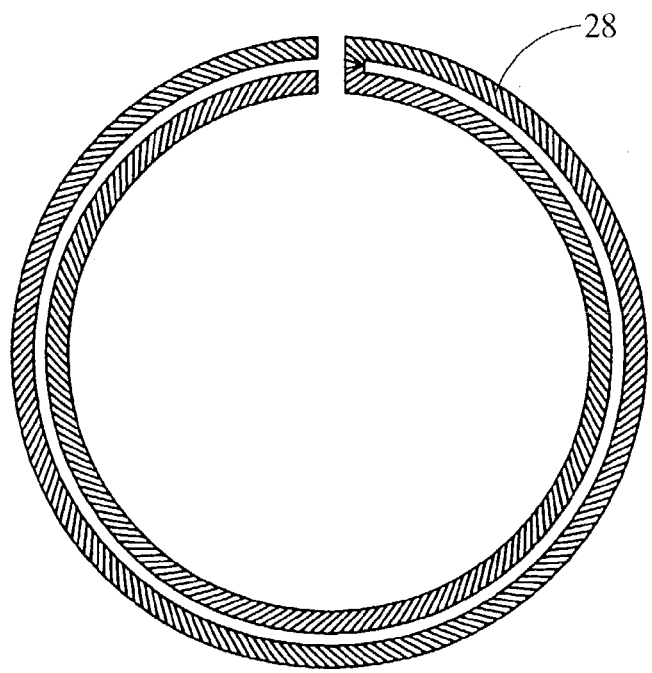
FIG. 4 is a top view of a flat wire pack that has been folded and then rolled into a generally cylindrical shape having two layers.
Figure 5:
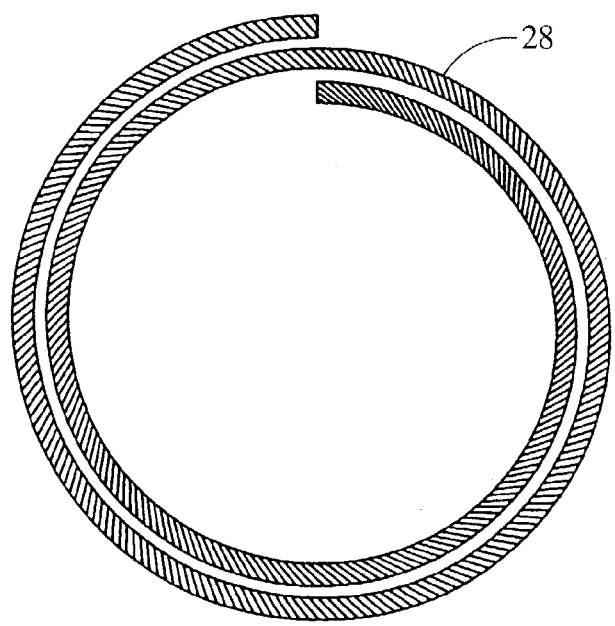
FIG. 5 is a top view of a flat wire pack that has been rolled into a generally cylindrical spiral having two layers.
Figure 6:
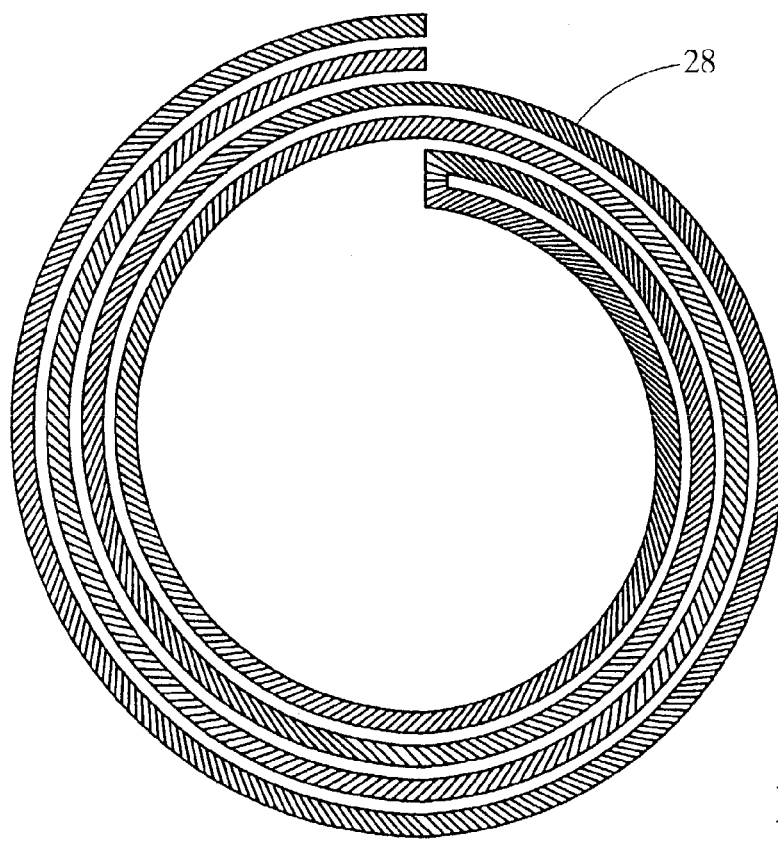
FIG. 6 is a top view of a flat wire pack that has been folded and then rolled into a generally cylindrical spiral having four layers.

Once the proper length of flat wire pack 28 is formed, the flat wire pack 28 is shaped into a substantially cylindrical shape prior to being inserted to the stator core. The flat wire pack 28 can be rolled into a generally cylindrical shape having a single layer, as shown in FIG. 3; or folded in half and rolled into a generally cylindrical shape having two layers, as shown in FIG. 4. Alternatively, the flat wire pack 28 can be rolled into a generally cylindrical spiral having a plurality of layers, as shown in FIG. 5, wherein the spiral forms two layers, or folded and rolled into a generally cylindrical spiral having a plurality of layers, as shown in FIG. 6, wherein the spiral forms four layers.

After the flat wire pack 28 is formed into a generally cylindrical shape, the flat wire pack 28 is inserted within the slots of the stator core such that the continuous electrical wires 14 are interlaced within the slots of the stator core.

Figure 7:
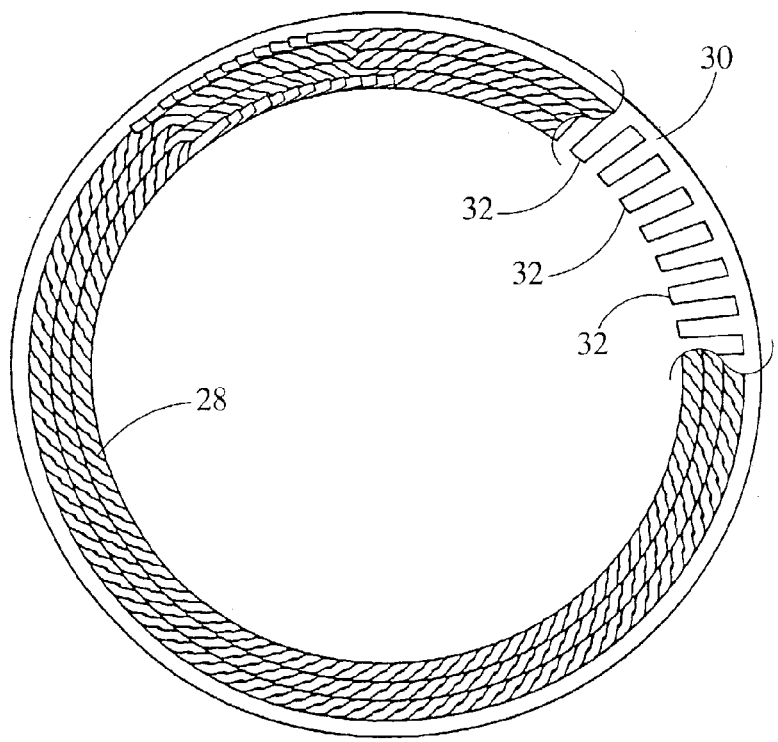
FIG. 7 is a top view of a stator core assembly after a flat wire pack having three layers has been engaged with the inwardly facing slots of the stator core.

Referring to FIG. 7, a stator core 30 can include slots 32 that face inward toward the center of the stator core 30. The flat wire pack 28 is placed within the stator core and expanded outward such that the continuous electrical wires 14 are interlaced within the slots 32 of the stator core 30.

Figure 8:
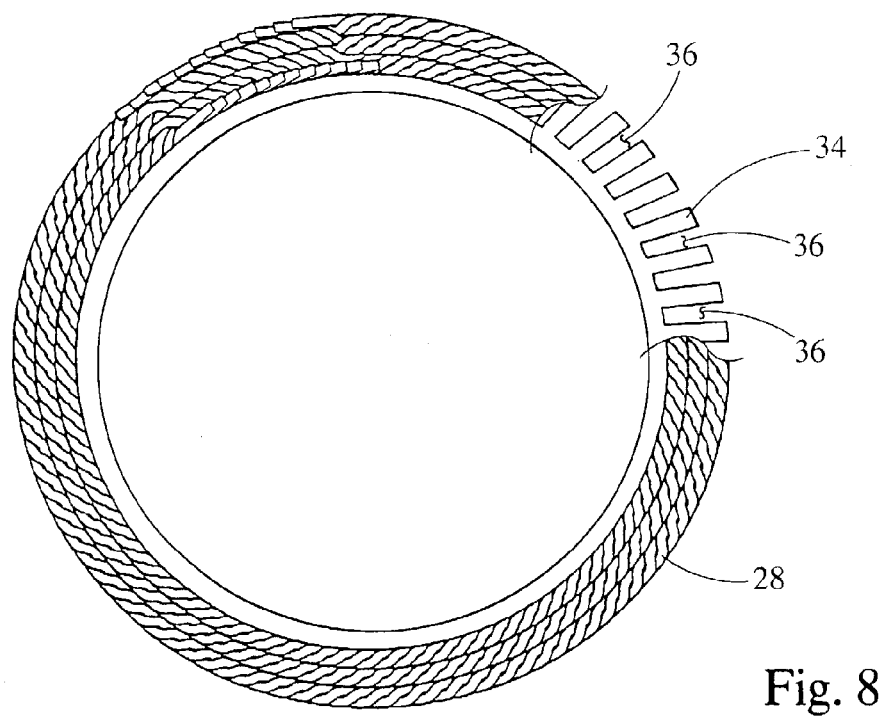
FIG. 8 is a top view of a stator core assembly after a flat wire pack having three layers has been engaged with the outwardly facing slots of the stator core.

Referring to FIG. 8, a stator core 34 can include slots 36 that face outward away from the center of the stator core 34, wherein the flat wire pack 28 is placed around the stator core 34 and compressed inward such that the continuous electrical wires 14 are interlaced within the slots 36 of the stator core 34.

Figure 9:
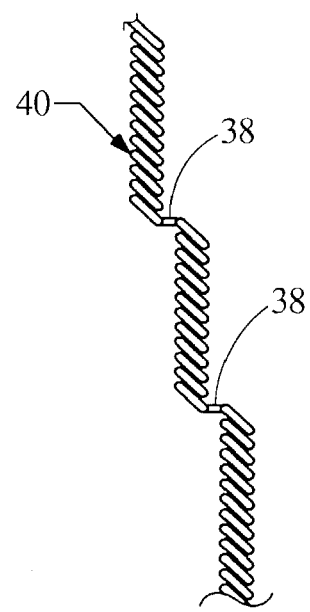
FIG. 9 is a top view of a flat wire pack having two transitional areas formed therein.
Figure 10:
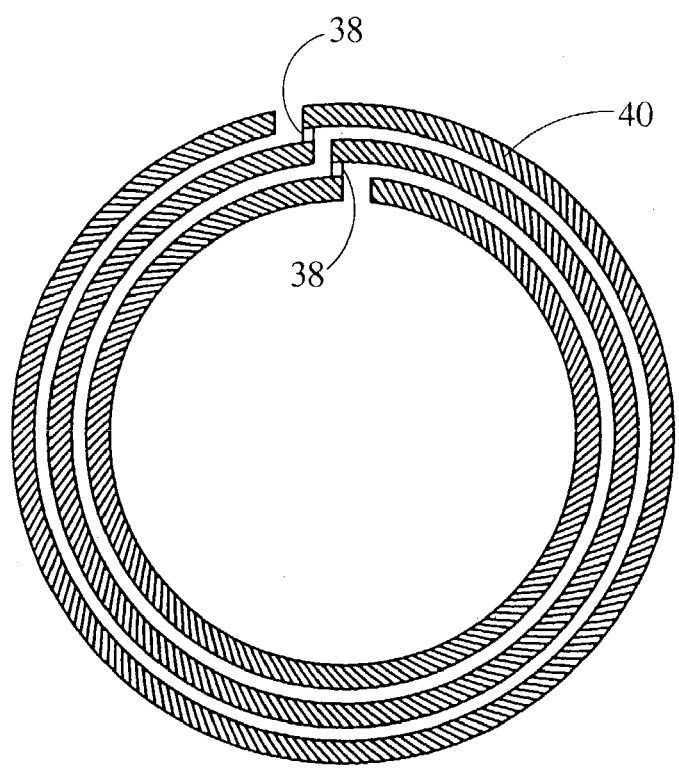
FIG. 10 is a top view of the flat wire pack shown in FIG. 9 after the flat wire pack has been rolled into a generally cylindrical shape having three layers.

Preferably, if the flat wire pack 28 is to be rolled into a generally cylindrical spiral, at least one transitional area 38 is formed within the flat wire pack 28. The transitional areas 38 are formed at the points where the layers overlap one another to allow efficient filling of the slots within the stator core by the electrical wire. Referring to FIG. 9, a flat wire pack having two transitional areas 38 is shown generally at 40. The transitional areas 38 allow the layers to lay over one another at the point where the flat wire pack 40 overlaps itself when rolled up, as shown in FIG. 10.

The transitional areas 38 are formed within the flat wire pack 40 as the flat wire pack 40 is being formed. As discussed earlier, the number of complete revolutions that the spools 12 and the plate 18 must make for each layer while forming the flat wire pack 40 is the number of slots of the stator core divided by the number of phases of the stator assembly. To begin the formation of a transitional area within the flat wire pack, the forward rotation of the spools 12 about the central axis 16 and the rotation of the springs 22, 24 is stopped. The first spring 22 is moved outward toward the spools 12. While the first spring 22 is moved outward, the first spring 22 is rotated to carry the wire 14 along the first spring 22 such that as the first spring 22 extends outward toward the spools 22 of continuous electrical wire 14 free coils 26 of the spring 22 are exposed. The spring 22 is rotated and moved toward the spools 12 until a free coil 26 is exposed for each of the wires 14.

Then, the spools 12 and the plate 18 are rotated one complete revolution about the central axis 16 in the opposite direction such that the wires 14 wrap in the opposite direction on the exposed coils 26 of the first spring 22. After one complete revolution of the spools 12 and the plate 18 around the central axis 16, the first spring 22 is moved back away from the spools 12 to its original position and the forward rotation of the spools 12, the plate 18, and the first and second springs 22, 24 is continued.

The single rotation of the spools 12 and the plate 18 in the opposite direction accounts for one of the rotations needed to complete that layer. As discussed earlier, the number of complete revolutions, N, that the spools 12 and the plate 18 must make for each layer while forming the flat wire pack 40 is the number of slots of the stator core divided by the number of phases of the stator assembly. Therefore, for each layer that requires a transitional area 38, the spools 12 and the plate 18 will be rotated in the forward direction N–1 times. The formation of the transitional area 38 completes the formation of that particular layer.

While the above description constitutes the preferred embodiment of the present invention, it will be appreciated that the invention is susceptible to modification, variation and change without departing from the proper scope and fair meaning of the accompanying claims.

We claim:

1. A method of forming a stator core assembly for an electric machine comprising:
    providing a stator core having a plurality of radially extending slots;
    forming a wire pack having a plurality of continuous electrical wires, the wire pack being flat;
    shaping the flat wire pack into a hollow cylindrical shape; and
    engaging the hollow cylindrically shaped flat wire pack with the stator core such that the continuous electrical wires are interlaced within the slots of the stator core, wherein engaging the flat wire pack with the stator core includes one of radially expanding and compressing the hollow cylindrical shape of the flat wire pack radially into the slots of the stator core.

2. The method of claim 1 wherein the radially extending slots of the stator core open inward toward a center of the stator core, and engaging the hollow cylindrically shaped flat wire pack with the stator core such that the continuous electrical wires are interlaced within the slots of the stator core includes placing the hollow cylindrically shaped flat wire pack within the stator core and radially expanding the hollow cylindrically shaped flat wire pack outward such that the continuous electrical wires are interlaced within the slots of the stator core.

3. The method of claim 1 wherein the radially extending slots of the stator core open outwardly away from a center of the stator core, and engaging the hollow cylindrically shaped flat wire pack with the stator core such that the continuous electrical wires are interlaced within the slots of the stator core includes placing the hollow cylindrically shaped flat wire pack around the stator core and radially compressing the substantially cylindrically shaped flat wire pack inward such that the continuous electrical wires are interlaced within the slots of the stator core.

4. A method of forming a stator core assembly for an electric machine comprising:
    providing a stator core having a plurality of radially extending slots;
    providing a plurality of spools of continuous electrical wire;

rotatably mounting the spools of continuous electrical wire to a rotating structure in a generally circular pattern wherein the spools are equally circumferentially spaced with respect to one another about a central axis;

providing first and second springs spaced from one another at a distance from the spools of wire, each of the springs being rotatable about an axis extending longitudinally through the springs, the axis of each of the springs being parallel to the central axis;

attaching ends of the electrical wire from each of the spools to consecutive coils of the first spring;

rotating the spools about the central axis such that the electrical wires are wrapped around consecutive coils of the second spring;

rotating the springs such that the electrical wires are carried along the springs away from the spools of wire;

rotating the spools and the springs simultaneously and continuously such that the wires are wrapped alternately between consecutive loops of the first and second springs as the wires are carried along the springs, thereby forming a flat wire pack of interlaced continuous electrical wires;

shaping the flat wire pack into a substantially cylindrical shape; and engaging the substantially cylindrically shaped flat wire pack with the stator core such that the continuous electrical wires are interlaced within the slots of the stator core, wherein engaging the flat wire pack with the stator core includes one of expanding and compressing the flat wire pack radially into the slots of the stator core.

5. The method of claim 4 wherein the electrical wire has a substantially rectangular cross sectional shape.

6. The method of claim 5 wherein rotating the spools about the central axis includes keeping each individual spool rotationally stationary with respect to its own axis, such that the continuous electrical wires are not twisted as they are wrapped around the first and second springs.

7. The method of claim 4 wherein the springs rotate at a rotational speed that is slower than the rotational speed that the spools rotate about the central axis and calibrated such that as the spools rotate them is always a free coil of one of the springs to receive the wire, and only one wire is wrapped around each coil of the springs.

8. The method of claim 4 further including forming at least one transitional area within the flat wire pack.

9. The method of claim 8 wherein forming a transitional area within the flat wire pack includes:

stopping the forward rotation of the spools about the central axis and stopping the rotation of the springs;

moving a first of the springs toward the spools of continuous electrical wire while simultaneously rotating the first spring to carry the wire along the first spring such that the first spring extends outward toward the spools of continuous electrical wire and exposes a plurality of free coils;

rotating the spools one complete revolution about the central axis in the opposite direction such that the wires wrap in the opposite direction on the exposed coils of the first spring; and moving the first spring away from the spools of continuous electrical wire to its original position and commencing the forward rotation of the spools about the central axis and the rotation of both of the springs.

10. The method of claim 4 wherein shaping the flat wire pack into a substantially cylindrical shape includes rolling the length of flat wire pack into a generally cylindrical shape having one layer.

11. The method of claim 4 wherein shaping the flat wire pack into a substantially cylindrical shape includes rolling the length of flat wire pack into a generally cylindrical spiral having a plurality of layers.

12. The method of claim 4 wherein shaping the flat wire pack into a substantially cylindrical shape includes folding the flat wire pack in half and rolling the folded flat wire pack into a generally cylindrical shape having two layers.

13. The method of claim 4 wherein shaping the flat wire pack into a substantially cylindrical shape includes folding the flat wire pack in half and rolling the length of flat wire pack into a generally cylindrical spiral having a plurality of layers.

14. A method of forming a stator core assembly for an electric machine comprising:

providing a stator core having a plurality of radially extending slots;

providing a plurality of spools of continuous electrical wire;

rotatably mounting the spools of continuous electrical wire to a rotating structure in a generally circular pattern wherein the spools are equally circumferentially spaced with respect to one another about a central axis;

providing first and second springs spaced from one another at a distance from the spools of wire, each of the springs being rotatable about an axis extending longitudinally through the springs, the axis of each of the springs being parallel to the central axis;

attaching ends of the electrical wire from each of the spools to consecutive coils of the first spring;

rotating the spools about the central axis such that the electrical wires are wrapped around consecutive coils of the second spring;

rotating the springs such that the electrical wires are carried along the springs away from the spools of wire;

rotating the spools and the springs simultaneously and continuously such that the wires are wrapped alternately between consecutive loops of the first and second springs as the wires are carried along the springs, thereby forming a flat wire pack of interlaced continuous electrical wires;

shaping the flat wire pack into a substantially cylindrical shape; and engaging the substantially cylindrically shaped flat wire pack with the stator core such that the continuous electrical wires are interlaced within the slots of the stator core.

15. The method of claim 14 wherein the radially extending slots of the stator core open inward toward a center of the stator core, and engaging the substantially cylindrically shaped flat wire pack with the stator core such that the continuous electrical wires are interlaced within the slots of the stator core includes placing the substantially cylindrically shaped flat wire pack within the stator core and expanding the substantially cylindrically shaped flat wire pack outward such that the continuous electrical wires are interlaced within the slots of the stator core.

16. The method of claim 15 wherein rotating the spools about the central axis includes keeping each individual spool rotationally stationary with respect to its own axis, such that the continuous electrical wires are not twisted as they are wrapped around the first and second springs.

17. The method of claim 14 wherein the radially extending slots of the stator core open outwardly away from a center of the stator core, and engaging the substantially cylindrically shaped flat wire pack with the stator core such that the continuous electrical wires are interlaced within the slots of the stator core includes placing the substantially cylindrically shaped flat wire pack around the stator core and compressing the substantially cylindrically shaped flat wire pack inward such that the continuous electrical wires are interlaced within the slots of the stator core.

18. The method of claim 14 wherein the electrical wire has a substantially rectangular cross sectional shape.

19. The method of claim 14 wherein the springs rotate at a rotational speed that is slower than the rotational speed that the spools rotate about the central axis and calibrated such that as the spools rotate there is always a free coil of one of the springs to receive the wire, and only one wire is wrapped around each coil of the springs.

20. The method of claim 14 further including forming at least one transitional area within the flat wire pack.

21. The method of claim 20 wherein forming a transitional area within the flat wire pack includes:
   stopping the forward rotation of the spools about the central axis and stopping the rotation of the springs;
   moving a first of the springs toward the spools of continuous electrical wire while simultaneously rotating the first spring to carry the wire along the first spring such that the first spring extends outward toward the spools of continuous electrical wire and exposes a plurality of free coils;
   rotating the spools one complete revolution about the central axis in the opposite direction such that the wires wrap in the opposite direction on the exposed coils of the first spring; and
   moving the first spring away from the spools of continuous electrical wire to its original position and commencing the forward rotation of the spools about the central axis and the rotation of both of the springs.

22. The method of claim 14 wherein shaping the flat wire pack into a substantially cylindrical shape includes rolling the length of flat wire pack into a generally cylindrical shape having one layer.

23. The method of claim 14 wherein shaping the flat wire pack into a substantially cylindrical shape includes rolling the length of flat wire pack into a generally cylindrical spiral having a plurality of layers.

24. The method of claim 14 wherein shaping the flat wire pack into a substantially cylindrical shape includes folding the flat wire pack in half and rolling the folded flat wire pack into a generally cylindrical shape having two layers.

25. The method of claim 14 wherein shaping the flat wire pack into a substantially cylindrical shape includes folding the flat wire pack in half and rolling the length of flat wire pack into a generally cylindrical spiral having a plurality of layers.

\* \* \* \* \*